Sept. 10, 1963    J. R. GAINES ETAL    3,103,369
SAFETY WHEEL FOR RACING SULKIES
Filed Jan. 12, 1960    4 Sheets-Sheet 1
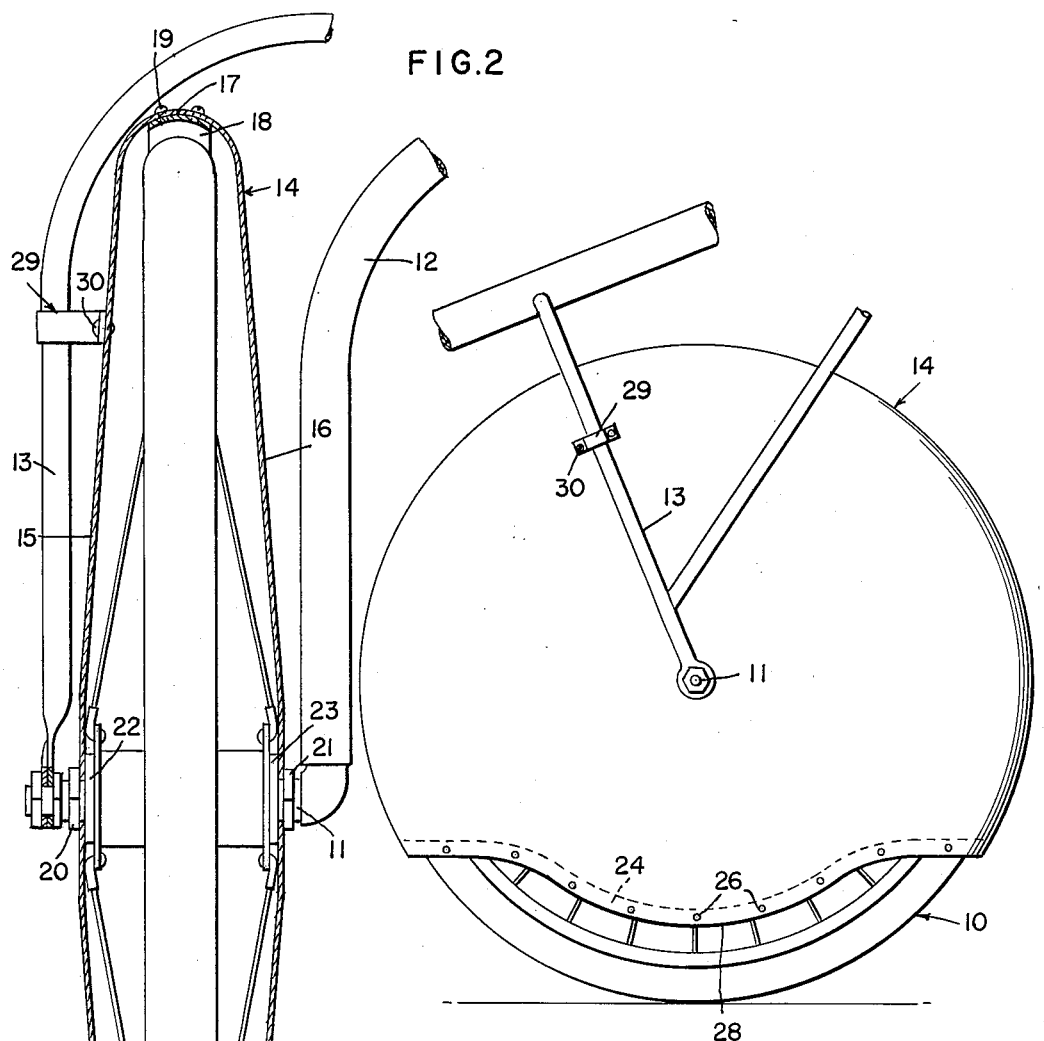
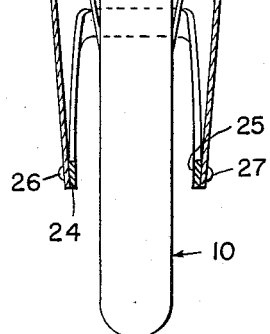
Inventors
John R. Gaines
Clarence F. Gaines
Chester C. De Pew
By Shoemaker & Mattare
ATTYS

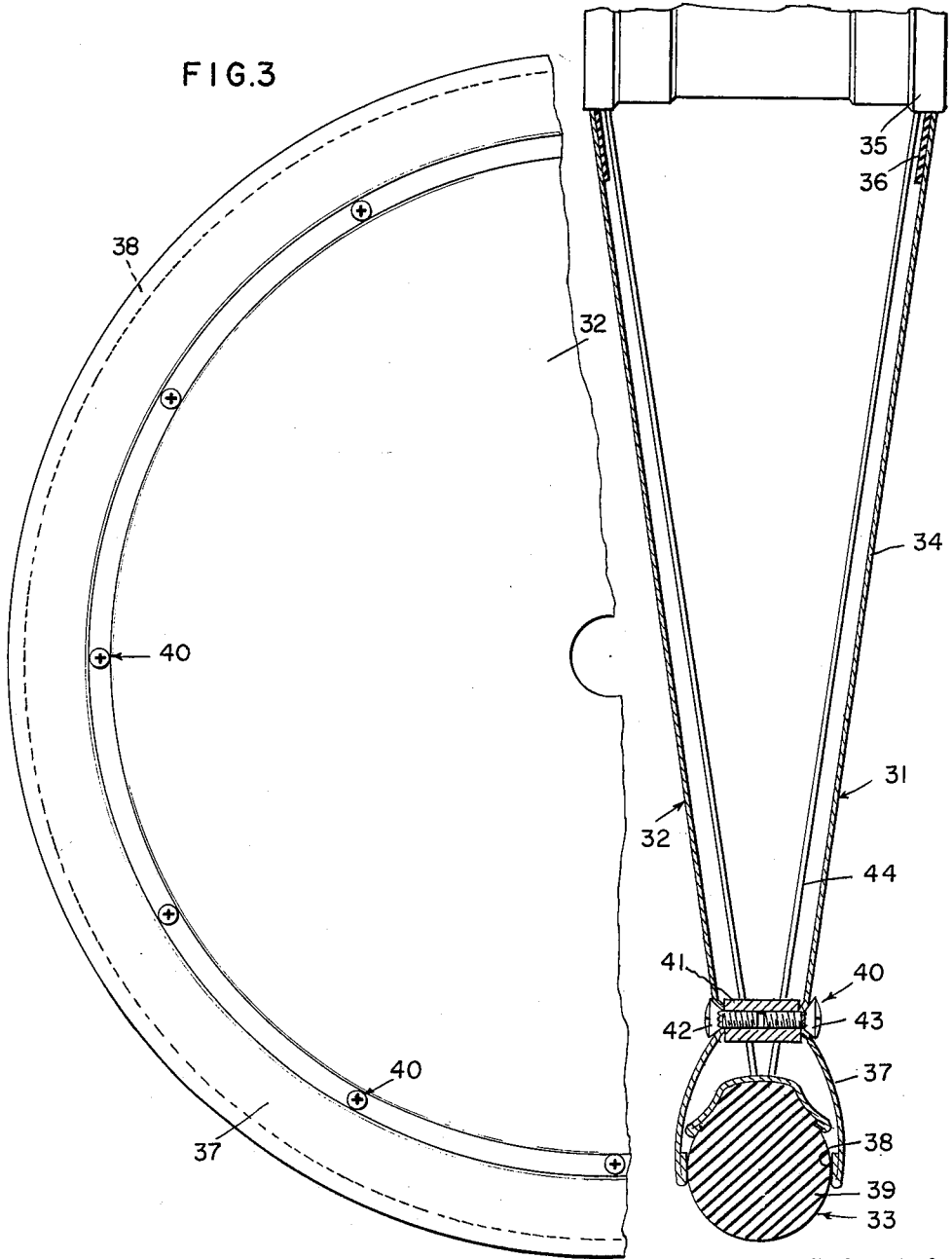

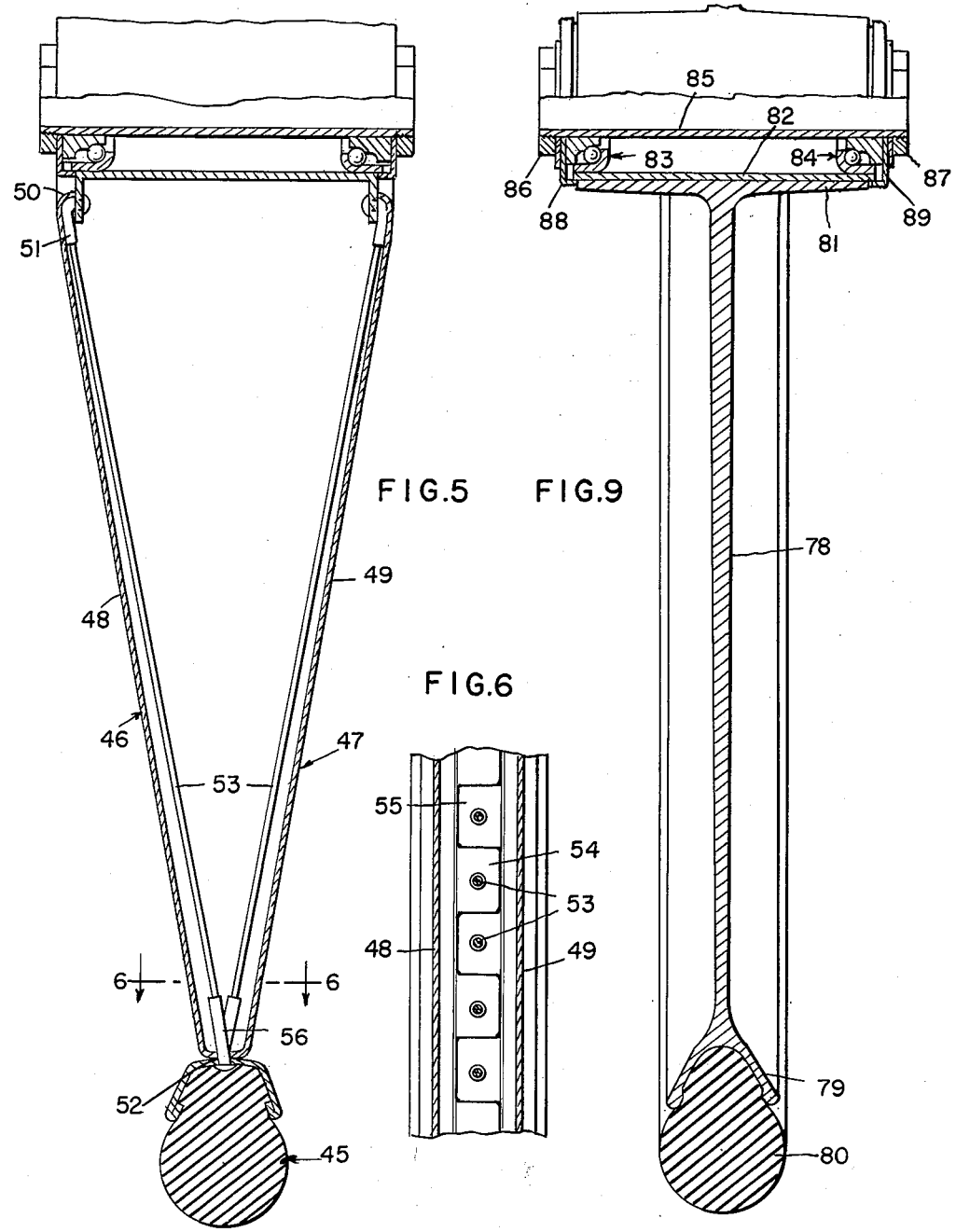

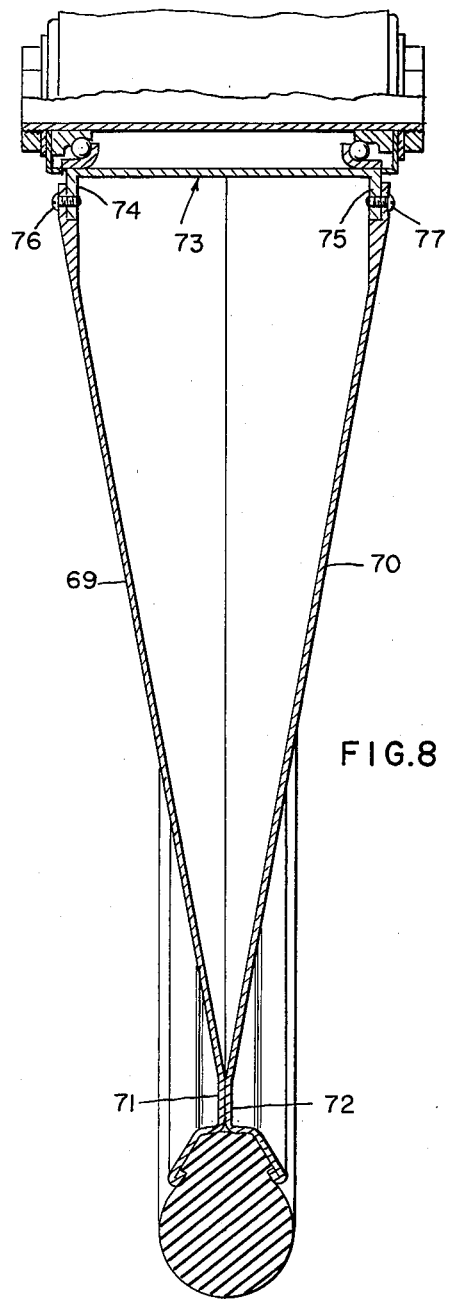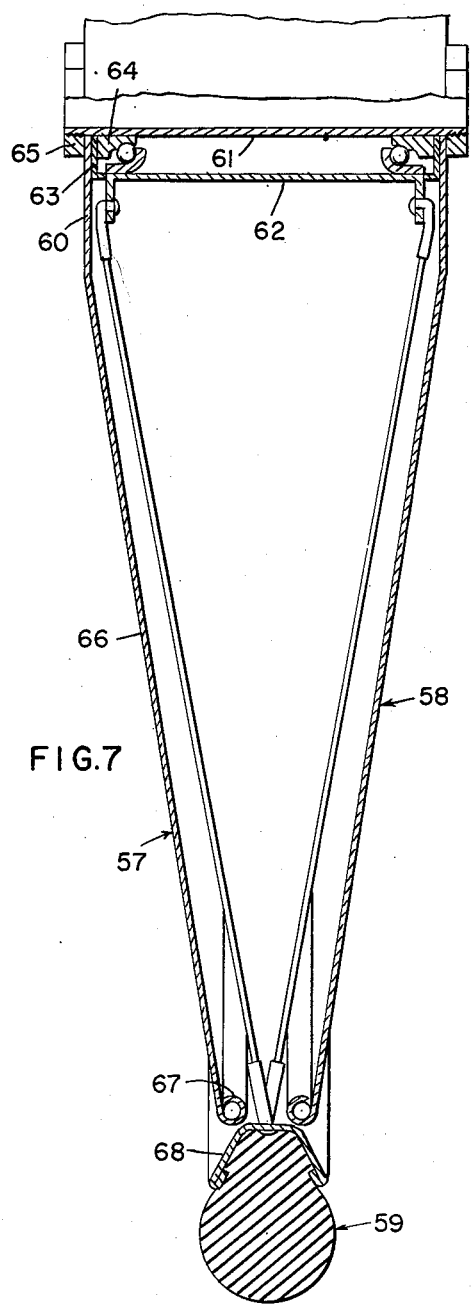

United States Patent Office 3,103,369
Patented Sept. 10, 1963

3,103,369
SAFETY WHEEL FOR RACING SULKIES
John R. Gaines, Lexington, Ky., and Clarence F. Gaines, Sherburne, and Chester C. De Pew, Farmingdale, N.Y.
Filed Jan. 12, 1960, Ser. No. 2,074
1 Claim. (Cl. 280—63)

This invention relates to improvements in sulky vehicles, particularly as used in horse racing and pertains more particularly to certain improvements in the wheels of a sulky, either directly incorporated in the wheel or in combination therewith such as to improve the efficiency of the sulky as well as providing a safety feature in sulky racing and other advantages of merit hereinafter more fully set forth. This application is a continuation in part of our copending application Serial No. 635,053, filed January 18, 1957, now abandoned.

Horse racing sulkies are normally provided with spoke wheels. There are many disadvantages to the use of spoke wheels, some of which are readily apparent and many others of which are not at all apparent and, indeed, did not become so until the inception of the present invention. One of the most obvious advantages of the present invention over the spoke wheels conventionally in use on racing sulkies is that the present invention will prevent a horse's hoof or hoofs from becoming entangled with spokes. That is to say, it is not too uncommon for sulkies racing in close proximity to each other to be so maneuvered that the hoofs of one of the horses will strike the near wheel of the other sulky. This may seriously damage the sulky so struck, for example, by collapsing of the wheel and, of course, it also represents a real and present danger to the horse since the horse's hoof may become cut, broken or otherwise damaged causing serious injury to the horse. It is, therefore, of interest in connection with this invention to provide means for overcoming the above problem.

Another advantage of the present invention is the reduction in wind resistance obtained by the use of disc wheels or disc covers for sulky spoke wheels, which reduction in wind resistance permits the horse to travel faster. It is, therefore, another object of this invention to provide means for permitting a horse to draw the sulky at a faster speed particularly when racing with a high prevailing wind.

A further object of this invention is to provide a disc type wheel or disc cover for spoke wheels of a racing sulky which accrues the unobvious advantage of preventing dirt, sand and small pebbles from being thrown into the face and eyes of the horses and drivers. That is to say, with conventional spoke wheels, when air borne, dirt or other objects are hit by a revolving spoke, they are given an additional momentum thereby which is very likely to cause them to be thrown into the face and eyes of nearby horses and drivers, presenting a safety hazard which is overcome by the instant invention.

Another advantage accruing from the instant invention is the fact that disc wheels or covers, as contrasted to exposed spoke wheels as conventionally provided, permit of the application of luminous paint of one or several colors which may be in accordance with the stable colors. This is particularly useful in night racing, which has become increasingly prevalent, and presents an additional safety feature inasmuch as the sulkies are more readily discernible to the other drivers. Also, the sulkies are more easily identified by the spectators.

An additional safety feature embodied in the present invention is the protection afforded by pneumatic tires commonly used in racing sulkies, materially lessening the chance for the tires becoming cut and thus deflated by contact with a horse's hoofs.

It is a further object of this invention to provide a novel wheel construction which obviates the necessity for spokes and, consequently, presents a smooth surface and one in which a horse's hoof cannot become entangled.

Still another object of this invention is to provide an attachment or accessory for racing sulkies which consists of a kick guard which is readily and easily attached to a conventional spoke type wheel.

Still a further object of this invention is to provide a kick guard of the character described which is securely held in place in a conventional spoke wheel by means of the spoke elements themselves so as to form and effect a permanent attachment for the wheel.

Another object of this invention is to provide a guard of the character described which serves the purpose of protecting a sulky wheel and which, at the same time, also serves to act as a mud guard and as a means for protecting the rubber tires of a sulky from damage by contact with a horse's hoof.

With the above and other objects in view, the invention consists in the construction and novel combination and arrangement of parts hereinafter fully described, illustrated in the drawings and pointed out in the claim hereto appended, it being understood that various changes in the form, proportions, and minor details of construction, within the scope of the claim, may be resorted to without departing from the spirit or sacrificing any of the advantages of the invention.

In the drawings:

FIG. 1 is a side elevational view of a sulky wheel and adjacent portions of the sulky frame and showing one form of a kick cover or guard attached thereto;

FIG. 2 is an enlarged sectional view taken through the assembly shown in FIG. 1 and illustrating constructional details of the wheel cover;

FIG. 3 is an elevational view of a portion of a modified form of wheel cover or kick guard and showing the same attached to an associated sulky wheel;

FIG. 4 is a vertical section on an enlarged scale taken through the assembly of FIG. 3;

FIG. 5 is a sectional view showing a still further modified form of wheel cover attachment;

FIG. 6 is an enlarged sectional view taken along the plane of section line 6—6 in FIG. 5 and illustrating the manner in which the kick guard or wheel cover is held in place;

FIG. 7 illustrates a still further modified form of wheel cover or kick guard attachment;

FIG. 8 is a sectional view through a specially constructed wheel assembly which is of disc-like construction; and FIG. 9 is a sectional view showing a modified form of wheel construction.

Referring at this time most particularly to FIGS. 1 and 2, the reference numeral 10 indicates in general a conventional type of spoke wheel commonly used on racing sulkies to which this invention appertains. As shown in these figures, the wheel is journalled on the usual spindle portion 11 in the usual manner, the spindle being formed at the lower end of the inner frame element 12 and being received on its outboard end through the aperture at the lower end of the outer frame element 13. In order to guard against damage to the spokes of the wheel and also to obviate injury to a horse and prevent entanglement of the horse's hoof within the spokes of the wheel, the wheel guard or cover indicated generally by the reference character 14 is associated with the spoke wheel.

The cover kick guard consists of two separate halves 15 and 16 each provided with a substantially centrally located aperture receiving the spindle 11 therethrough with the two half sections being disposed on opposite sides of the wheel 10 with their marginal edges in abutting relation as is indicated by the reference character 17 in FIG. 2.

The line along which the edges abut lies in the central plane of the wheel as will be readily apparent and for the purpose of rigidly interconnecting the two half sections, a liner strip 18 is provided which engages the inner surfaces of the half sections and overlaps their abutting edges as shown. A number of screw fasteners 19 are utilized to hold the liner 18 firmly against the inner surfaces of the half sections such that the cover or kick guard is a rigid unitary assemblage.

For the purpose of rigidly holding the cover or guard in fixed relation to the wheel, it is preferred that the cover be located inside the wheel locating nuts 20 and 21 such that the cover, as shown, is sandwiched between these nuts and the outer races 22 and 23 of the conventional wheel journalling bearings.

To further rigidify this assemblage, the lower marginal edges of the half sections are provided with the stiffening ribs or strips 24 and 25 as will be seen most clearly in FIG. 2 and as shown, it is preferred that these rigidifying strips be firmly affixed in place by suitable means such as the rivets 26 and 27. The lower marginal edges of the half sections are identically formed and are configurated as is shown most clearly in FIG. 1 wherein it will be seen that the central portion 28 thereof is disposed lowermost when the wheel supports the sulky in the normal position with the forward and rear sides of the guard providing a greater clearance to permit the sulky frame to be rocked fore and aft without the guard engaging the ground surface and in this respect, it is to be understood that the approximate configuration shown in FIG. 1 is sufficient to enable the guard to clear the ground surface in any position the sulky may take even should the horse rear or when the sulky is unattached and with the poles thereof resting on the ground.

It is also preferred that the cover or kick guard be provided with additional means for fixing it to the sulky frame and for this purpose, a simple U-shaped strap indicated generally by the reference character 29 may be employed, which strap passes over the outer frame element 13 previously described and is attached rigidly to the outer face of the half section 15, as by the screw fasteners 30.

It will be readily appreciated that the foregoing kick guard or wheel cover may be easily attached to any conventional spoke wheel type of sulky with a minimum of effort and that the same effectively shields both the inner and outer faces of the wheel so that it will become a practical impossibility for the wheel to become damaged by kicking and it will also be impossible for a horse to entangle his hoofs in the spokes. Thus a not infrequent cause of accidents is to a large extent obviated by this particular construction.

The use of the kick guard or wheel cover will also materially reduce wind resistance and permit the horse to travel faster, particularly if there is a high prevailing wind. The covers will also obviate to a great extent the throwing about of pebbles, sand and other objects which occurs with uncovered spoke wheels. That is, a spoke wheel is very prone to strike air borne objects and strike them with sufficient force to create a definite safety hazard. The wheel covers prevent such objects from striking spinning spokes and thus materially reduces the danger of such flying objects. The covers also protect the tires from being cut by collision with a horse's hoof which not infrequently occurs with exposed conventional spoke wheels. Thus, the covers provide an additional safety feature since a deflated tire during a race will not only cause that particular sulky to be forced from the race, but it may also cause the driver to lose control, endangering the other contestants.

The covers also present good surface upon which paint can be applied so that the sulkies can be identified easily even at a great distance which is extremely beneficial from the spectators' standpoint. For example, the stable or racing colors could be applied to the covers of the individual sulkies so that they are easily discernible and identified at any part of the track upon which they are racing. Moreover, particularly in view of the fact that much night racing is done presently, luminous paint can be utilized which will show up not only in the day time but will be readily discernible also at night. Particularly with night racing, this is beneficial to the other contestants because each sulky so painted is more readily discernible to the other contestants and the chance of accidents occurring is thereby lessened.

In the wheel guard as is shown most clearly in FIGS. 3 and 4, the cover itself consists of an inner section 31 and an outer section 32, each identically formed and each being of general circular form. In this case, however, the wheel guard turns with the sulky wheel which is indicated generally by the reference character 33 and which, as shown, is of the conventional spoke type. Each of the guard sections includes a central portion 34 which is of generally conical shape and an opening is in its center to receive its corresponding end of the wheel hub 35 and bounding this opening on the inner side of each section is an annular resilient gasket element 36 which is adapted to sealingly engage the associated end of the hub 35 and prevent the entry of foreign material such as dirt and the like in between the two sections 31 and 32. The gasket element also serves to prevent rattling of the guard assembly and chafing due to vibrations of the plate against the spokes. Each section also includes an outer marginal edge portion 37 which is slightly arcuated as shown and terminates at its free edge in a double-back portion 38, the inner surface of which is adapted to engage directly against the rubber portion 39 of the tire. The flange provided by each double-back portion 38 serves as a reinforcing element and as a means for protecting the rubber tire 39 and for this purpose, it is preferred that the marginal edge portion 37 extend in partially covering relationship on opposite sides of the tire as is shown most clearly in FIG. 4.

To hold the sections in place on the associated wheel, a number of clamping elements 40 are provided in circumferentially spaced relationship around the guard as is shown most clearly in FIG. 3. Each of these clamping elements consists of a spacer element 41 which extends between the opposed surfaces of the sections 31 and 32 and which is provided with a centrally located threaded bore for receiving the screw members 42 and 43 which pass through suitable openings in the sections and firmly clamp them against the spacer element 41. The lengths of the spacer elements are so chosen as to engage the previously mentioned portions 38 of each section against the opposite sides of the tire 39 when the screws 42 and 43 are drawn down tight. The spacer element 41 is of such a width or diameter as to pass between adjacent spokes 44 of the wheel and serve, in conjunction with the clamping action of the sections against the tire, to fix the sections 31 and 32 against rotation with respect to the wheel 33.

From the above, it will be seen that the construction described in conjunction with FIGS. 3 and 4 forms a very effective kick guard for the entire area of the wheel and on both sides thereof and one which may be very easily and quickly attached to any conventional spoke wheel.

The modification shown in FIGS. 5 and 6 is in many respects similar to that shown in FIGS. 3 and 4 due to the fact that it too rotates with the sulky wheel 45 and is rigidly affixed thereto. However, in the form of the invention shown in FIGS. 5 and 6, the two guard sections 46 and 47 consist only of the main body portions 48 and 49 which are of conical configuration provided with openings in their central portions defined by the arcuately turned in edges 50 which are adapted to embrace over the inner ends 51 of the spokes as is shown most clearly in FIG. 5. The outer edges of each of such body portions 48 and 49 terminate in the inwardly directed lips 52 which are cut into sawtooth form as is shown most clearly in FIG. 6 with the spacing between adjacent tabs or teeth being equal to twice the distance between adjacent spokes 53 and with the tabs or teeth 54 and 55 of the two sections being interdigitated as shown. Each of the teeth or tabs is apertured centrally and receives the outer spoke retaining element 56 therethrough so that the spoke retaining element 56 not only serves to anchor the spokes but also to hold the guard sections 46 and 47 in place. Therefore, it is necessary when attaching this type of kick guard to remove the spokes and re-assemble the wheel with the cover sections in place.

In the form of the invention shown in FIG. 7, the kick guard consists of two sections 57 and 58 which are disposed on opposite sides of the wheel 59 and each of which is provided with a flat disc-like central portion 60 centrally apertured to receive its corresponding end of the axle tube 61 which passes through the wheel hub 62. This central portion rests against a dust cover element 63 which in turn rests against the inner race 64 of the corresponding wheel journalling bearing and is rigidly affixed in place by means of the bearing retaining or wheel locating nut 65 as is clearly shown.

Each section 57 or 58 also includes an outer portion 66 which is of conical configuration and which terminates in its outer marginal edge in a rolled-over portion 67 which is located just inside the rim 68 of the wheel. Therefore, in this particular modification the kick guard does not rotate with the wheel and in this respect is similar to the construction shown in FIGS. 1 and 2, although it is, of course, not affixed to the actual framework of the sulky.

FIG. 8 illustrates a modification of this invention wherein the wheel itself is so formed as to obviate the use of spokes and thus do away with the inherent disadvantages of the conventional wheel constructions and to this end, the wheel incorporates in its main body portion, a pair of conical disc portions 69 and 70 which engage each other circumferentially in the portions 71 and 72 and are rigidly interconnected at this point as by spot welding or the like, whereas the outer marginal edge portion of each of these members is formed to provide half of the rim structure for the wheel, as is clearly shown.

This type of wheel is so constructed as to readily employ the conventional type of wheel hub 73 and in this respect makes use of the conventional radial flange portions 74 and 75 normally used to anchor the inner ends of the spokes. However, in this particular modification of the invention, the two body portions 69 and 70 overlap the flanges 74 and 75 and are circumferentially apertured to receive the screw fasteners 76 and 77 which anchor the inner portions of the bodies directly to the wheel hub, as will be readily apparent. The material used for the body portion 69 and 70 may be metal or plastic or other suitable material possessing sufficient rigidity and toughness.

In the form of the invention shown in FIG. 9, the main body portion 78 of the wheel is formed of a centrally located single web of material having its outer edge formed as the rim 79 for the tire 80 and having an inner web portion 81 of generally cylindrical configuration having an internal diameter of a size to snugly receive the body 82 of the wheel supporting hub. The usual wheel supporting bearings 83 and 84 are employed as is the axle tube 85 and in this case it is preferred that the retaining nuts 86 and 87 be associated with dust cover caps 88 and 89 such that the caps receive the opposite ends of the hub body 82 and bear directly against the opposite ends of the portion 81 of the wheel. The material for the body 78 may be plastic or metal or other suitable material and, of course, is continuous throughout its area so as to obviate any possibility of damage to a horse by having the horse's hoof becoming entangled therewith.

The guards as hereinabove specifically set forth are useful in many respects and, in addition to those already mentioned hereinabove, it is to be understood that the use of the guards serves to protect the rubber tires from slashing or cutting by the horse's hoofs and, in addition, the sometimes troublesome problem of mud splashing is largely overcome by the use of the guards.

One of the big factors in the use of the disc wheel is the reduction in wind resistance. When these discs are used, as compared to the exposed metal spokes, a horse can go faster particularly when racing with a high prevailing wind. This is also a large factor when racing in the mud and on a wet track. Considerably less dirt, sand and small pebbles are thrown into the faces of the drivers and into the faces and eyes of the horses when the disc wheels or covers are used. When dirt or other objects are hit by a revolving or spinning spoke, they are given considerable impetus or momentum which hurls them at considerable speed in random fashion so that it is extremely likely that the horses and the drivers will be struck by such particles. When a cover or disc wheel is utilized, the smooth surface afforded will merely deflect airborne particles or objects and will not impart a further and greater velocity thereto.

Another factor which would be particularly useful in night racing, and the majority of races are held at night at the present time, is the use of luminous paint on the discs which makes the wheels more readily discernible by both the horse and driver, thus providing a further safety feature. The various stables can use a combination of their own registered racing colors so that the spectators can not only have a better view, but they will also know the exact location of the horse they are interested in at any point on the track.

Horse racing consists of flat racing and sulky racing. The contestants of the flat race have no interference factors compared to the drivers using sulkies in harness racing. In order to permit sulky or harness racing to grow and compete with flat racing, provision must be made that every measure of safety be present so that the contestants may compete on equal grounds and one will not possess favorable conditions over the other. The wheels of competing sulkies often become locked and the extra strength provided by the disc wheels in accordance with this invention is a substantial safety factor. For example, evidence of the necessity for devices in accordance with the present invention is present in a recently contested race in which six of the eight horses became involved in an accident due to one horse putting his foot through the sulky wheel of another contestant. As a result, the race track was obliged to refund the money of the bettors, resulting in substantial financial loss not only to the owners of the track, but also the state in which the race was taking place.

Another factor which is important is the ease of caring for the wheels, hubs, rims, tires and so forth. In accordance with the present invention, the wheels, etc. are much more convenient to maintain and when the kick guards are used, the same prevails inasmuch as they act as guards to prevent the wheels from becoming dirty as quickly as an exposed wheel. The disc type wheels render the same practically water and dirt proof and consequently last for a much longer period of time. Spokes of an exposed wheel as used presently, become rusted and are difficult to keep tightened which causes the rims to get out of alignment and wobble which, in itself, is a dangerous condition. Additionally, a wheel in this condition also causes considerable friction similar to the friction experienced by an automobile which is out of alignment. This, in turn, of course reduces the speed at which the horse may draw the sulky. Inasmuch as many races are won or lost by as little as one-fifth of a second or less, it is easily understandable that the rigidity and trueness of a wheel so as to reduce the friction as much as possible is an important consideration.

Additionally, often times the drivers in sulky races weigh 200 pounds or more. This excess weight on the turns of the track causes considerable deformation of spoke wheels which causes additional friction which would be eliminated through the use of rigid disc wheels in accordance with the present invention. Further, a more rigid wheel than the conventional type of spoke wheel permits the vehicle to become more buoyant over rough ground inasmuch as the wheel does not act nearly as much as a shock absorbing device as does the more resilient spoke wheel and, therefore, when rough ground is encountered, the more rigid disc wheels will make the vehicle or sulky quite buoyant making it easier for the horse to draw the same.

On wet or muddy tracks, particularly on dirt and clay surface tracks, the dirt and clay often cling between the spokes, gather on the hubs and rims and naturally cause a very definite retarding effect on the speed of the horse. Furthermore, uneven distribution causes unbalance of the wheels which, of course, incurs an additional loss of speed.

Although these various factors may seem minute at first blush, they are nevertheless of an extreme importance and deserve consideration inasmuch as races are won or lost by fractions of an inch and split second timing. By eliminating as much as possible any of the above, all of the contestants are able to race on a more equal basis so that the merits of the drivers and the horses are more responsible for the performance rather than factors which may vary from one contestant to the other.

Further in regard to the safety features, the present invention eliminates the possibility of the driver's reins from becoming entangled in the spokes of the wheels. Often times the driver's reins are several feet longer than necessary and it is common practice to tuck the loose ends under the seat and have been known to become dislodged during a contest and become caught in the spokes of the wheels, causing serious accidents. This is also true of the driver's whip which sometimes becomes entangled in the wheels of a sulky or that of a competing sulky which may be adjacent and, of course, this is also a cause of serious accidents.

We claim:

In a racing sulky, a frame for attachment to a horse and having seating means thereon for a rider, a pair of spaced wheel assemblies supporting said frame and presenting smooth inner and outer side surfaces to prevent entanglement with a horse's hoof, each of said wheel assemblies including an axle tube, a pair of spaced bearings supported by said axle tube, a sleeve type wheel hub having spaced portions thereof rotatably journaled on said bearings, said wheel hub having radially outwardly extending circumferential flanges at opposite ends thereof, inner and outer main body portions, said main body portions being substantially conical in configuration and having centrally located apertures therein, the inner portions of said main body portions defining such apertures including on the inner opposed surfaces thereof similar circumferentially extending cutout portions defining circumferentially extending shoulders, said main body portions including circumferentially extending portions of enlarged thickness immediately outwardly of said cutout portions for strengthening the assembly and efficiently transferring loads from said main body portions to said wheel hub, said radially outwardly extending flanges on the hub being disposed within said cutout portions with the radially outer surfaces of said flanges in engagement with said shoulders throughout the entire width of said radially outer surfaces and with the outwardly facing end surfaces of said flanges flush with the inner opposed surfaces of said main body portions, circumferentially spaced fasteners rigidly securing said inner and outer main body portions to said flanges, said main body portions having circumferential flat portions adjacent their outer edges disposed in abutting relationship and rigidly fixed together to form a rigid wheel body, and the outer marginal edges of said main body portions being deformed outwardly from each other to define a wheel rim.

References Cited in the file of this patent

UNITED STATES PATENTS

| | | |
|---|---|---|
| 1,372,889 | Johnston | Apr. 5, 1921 |
| 1,406,945 | Dunlap et al. | Feb. 14, 1922 |
| 1,481,363 | Hall | Jan. 22, 1924 |
| 1,573,318 | Huber | Feb. 16, 1926 |
| 1,610,731 | Barth | Dec. 14, 1926 |
| 1,640,573 | Laddon et al. | Aug. 30, 1927 |
| 1,863,112 | Hanan | June 14, 1932 |
| 1,973,747 | Bukolt | Sept. 18, 1934 |
| 2,427,430 | Waldeck et al. | Sept. 16, 1947 |

FOREIGN PATENTS

| | | |
|---|---|---|
| 11,036/27 | Australia | Dec. 29, 1927 |
| 14,232 | Great Britain | of 1913 |